March 21, 1944.  S. G. LE GRESLEY  2,344,826
SAFETY VEHICLE DOOR LOCK
Filed Feb. 25, 1942  2 Sheets-Sheet 1
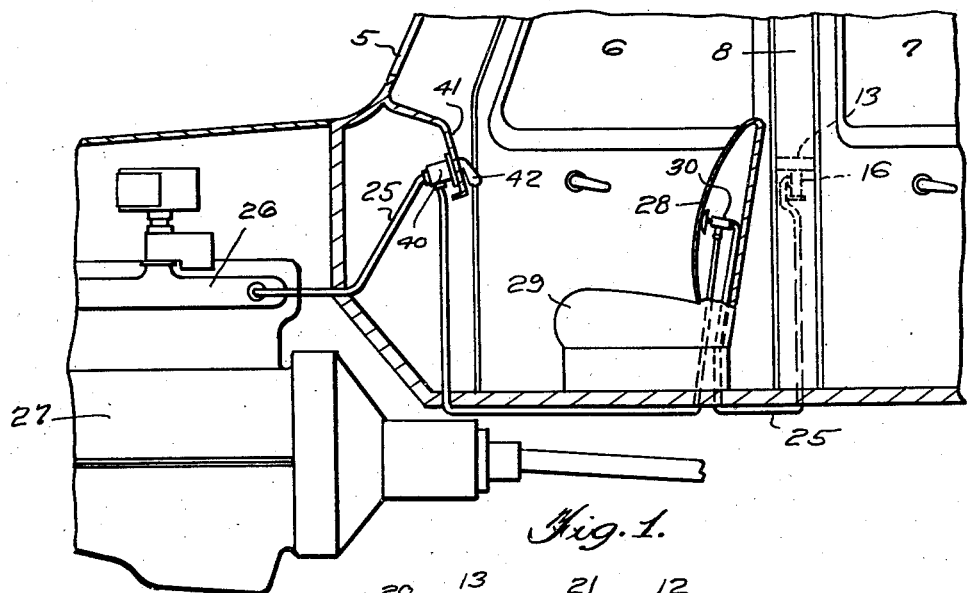
Fig. 1.
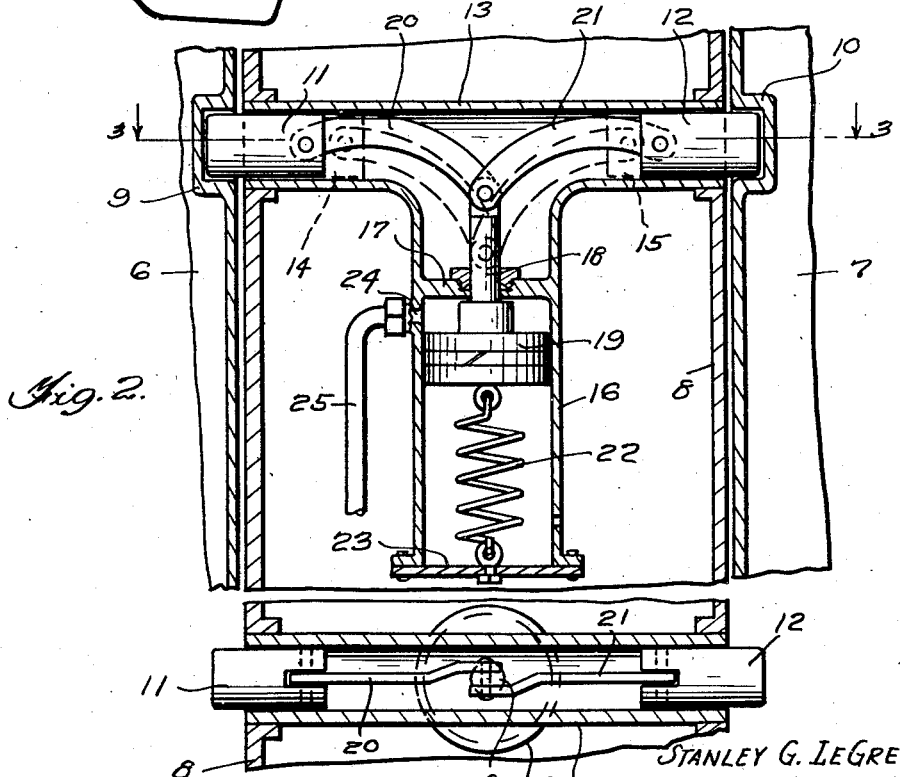
Fig. 2.
Fig. 3.
Inventor
STANLEY G. LeGRESLEY,
By Clarence A. O'Brien
and Harvey B. Jacobson
Attorneys March 21, 1944.    S. G. LE GRESLEY    2,344,826
SAFETY VEHICLE DOOR LOCK
Filed Feb. 25, 1942    2 Sheets-Sheet 2
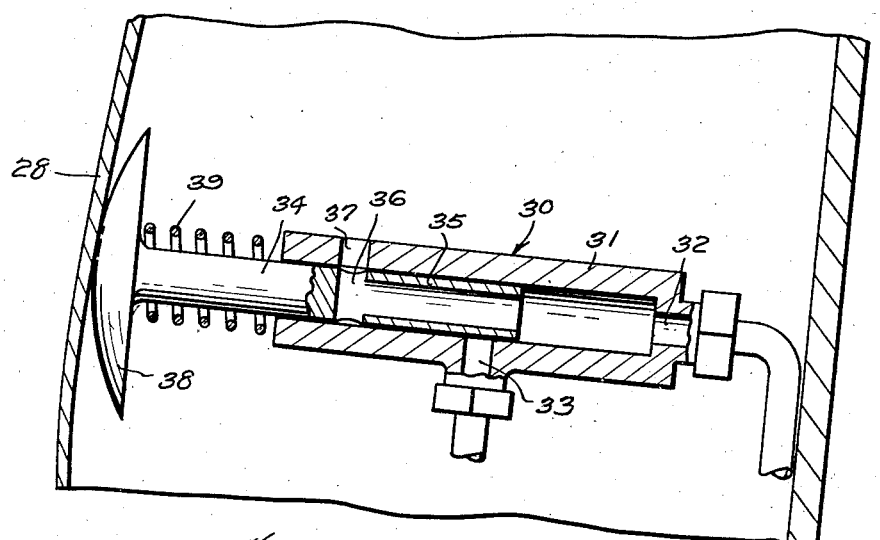
Fig. 4.
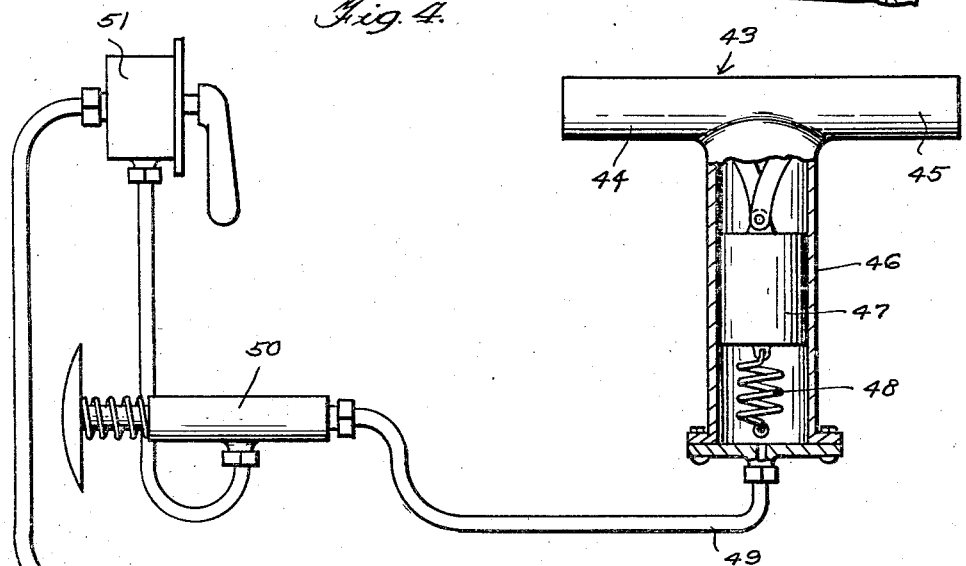
Fig. 5.
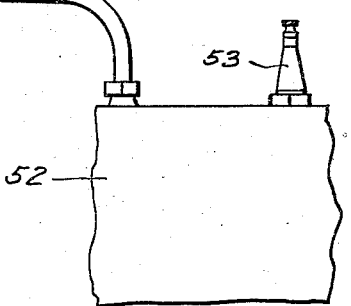
Inventor
STANLEY G. LE GRESLEY,
By Clarence A. O'Brien
and Harvey B. Jacobson
Attorneys Patented Mar. 21, 1944

2,344,826

UNITED STATES PATENT OFFICE 2,344,826

SAFETY VEHICLE DOOR LOCK

Stanley G. Le Gresley, Flint, Mich.

Application February 25, 1942, Serial No. 432,330

2 Claims. (Cl. 292—33)

The present invention relates to new and useful improvements in locks for the doors for automobiles and other motor vehicles and has for its primary object to provide fluid-actuated bolts adapted for movement into locking position with respect to the door and providing a valve control means for the fluid pressure means employed for actuating the bolts and in which the control valve is responsive to bodily movement of the driver of the vehicle to move the valve into a position for locking the bolts.

A further object is to provide a device of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a fragmentary sectional view through an automobile body illustrating the fluid system connected to the intake manifold of the engine for actuating the door bolts.

Figure 2 is a fragmentary vertical sectional view through the door post showing the locking bolts and cylinder actuating means therefor.

Figure 3 is a sectional view taken substantially on a line 3—3 of Figure 2.

Figure 4 is a fragmentary sectional view through the back of the seat of the automobile and showing the control valve mounted in position therein and with parts shown in section, and Figure 5 is a side elevational view of the locking system embodying fluid pressure actuating means therefor.

Referring now to the drawings in detail, and with particular reference to Figures 1 to 4, inclusive, the numeral 5 designates the body of an automobile having the front and rear doors 6 and 7 mounted therein with the free edges of the doors adapted for movement relative to the opposite sides of a vertical post 8 for securing the doors in closed position thereto. The free edges of the doors are formed with recesses 9 and 10, respectively, in which bolts 11 and 12 are adapted to enter, the bolts being slidably mounted in the opposite ends of a substantially T-shaped housing 13 which includes upper transverse cylinders 14 and 15 and a vertical cylinder 16 connected thereto.

In the upper portion of the cylinder 16 is a horizontal partition 17 through which a piston rod 18 is slidably mounted, the lower end of the piston rod having the piston 19 attached thereto and to the upper end of the piston rod are attached the links 20 and 21 of arcuate form and connected at their outer ends to the respective bolts 11 and 12, as shown to advantage in Figure 2 of the drawings.

To the underside of the piston 19 is attached a coil spring 22 connected to the bottom 23 of the cylinder for retracting the bolts 11 and 12.

Formed in the side wall of the cylinder 16, above the piston 19, is a port 24 having a suction pipe 25 attached thereto and leading to the intake manifold 26 of the engine 27. The suction pipe 25 extends upwardly into the back 28 of the driver's seat 29, the pipe having interposed therein a control valve shown generally at 30. The control valve includes a cylinder 31 having a port 32 in one end and a port 33 in one side thereof for connection with the suction pipe 25. Slidably mounted in the cylinder is a piston 34 having an open tubular inner end 35 communicating with lateral ports 36 formed in the piston, one of the ports 36 being adapted to register with the port 33 when the piston is moved inwardly.

The cylinder 31 is also provided with a lateral port 37 adapted to register also with one of the lateral ports 36 of the piston, when the latter is moved in to its outwardly projected position, as shown in Figure 4 of the drawings. The outer end of the piston 34 is provided with a head 38 behind which is positioned a coil spring 39 adapted to project the piston outwardly, the head being adapted to engage the front wall of the seat 28.

Also interposed in the supply pipe 25 is a control valve 40 mounted on the instrument panel 41 of the vehicle, the valve 40 having a control handle 42 for controlling communication through the pipe between the intake manifold 26 and the control valve 30.

In the operation of the device it will be apparent that when the valve 40 is open and the engine 27 is running, suction through the pipe 25 will be cut off by the piston 34 when the seat 29 is unoccupied and the bolts 11 and 12 will accordingly be held in their retracted position by the spring 22. However, when the driver leans back upon the seat 28, the piston 34 will be moved inwardly closing the port 37 and bringing the ports 33 and 36 into communication, whereby suction will be created in the pipe beyond the cylinder 31 and in the cylinder 16, whereby to raise the piston 19 and project the bolts 11 and 12 into locking position for securing the doors 6 and 7 against opening movement.

As soon as pressure is relieved from the head 38 of the piston 34, the spring 39 will move the piston 34 outwardly so as to cut off the suction pipe 25 and permit the spring 22 to retract the bolts.

In the form of the invention illustrated in Figure 5 of the drawings, the T-shaped housing for the bolts is designated at 43 having the lateral cylinders 44 and 45 at the upper portions thereof communicating with the vertical cylinder 46 in which the piston 47 is mounted. The spring for retracting the piston and the bolts mounted in the cylinders 44 and 45 is indicated at 48. A pipe 49 is connected at one end to the bottom of the cylinder 46 having the control valve 50 interposed therein for mounting in the seat of the vehicle and also having the control valve 51 interposed therein for mounting on the instrument panel. The pipe 49 leads to an engine cylinder 52 and is connected thereto for utilizing engine compression for operating the piston 47 the spark plug for the engine being shown at 53. In this form of the invention when the valves 50 and 51 are in their open position, pressure from the engine will be admitted to the bottom portion of the cylinder 46 for moving the piston 47 upwardly and thereby forcing the bolts in the cylinders 44 and 45 outwardly into door-locking position. A check valve (not shown) may be placed in the pipe 49 at a suitable position.

It will be understood that while the invention is illustrated for use upon double doors one of the bolts may be removed when it is desired to lock a single door.

It is believed the details of construction, manner of operation and advantages of the device will be readily understood from the foregoing without further detailed explanation.

Having thus described the invention what I claim is:

1. A vehicle door lock comprising a T-shaped housing positioned in a door post of the vehicle, said housing including a vertical cylinder and a horizontal cylinder communicating with each other, a partition in the vertical cylinder, a piston having a working fit in the vertical cylinder below the partition, a stem connected to the piston and projecting through the partition, a suction pipe connected to the vertical cylinder below the partition to raise the piston, spring means for lowering the piston, bolts slidably mounted in the ends of the horizontal cylinder, and links connecting the bolts to the piston stem, said bolts being projected from the ends of the horizontal cylinder upon an upward movement of the piston.

2. A vehicle door lock comprising a T-shaped housing positioned in a door post of the vehicle, said housing including a vertical cylinder and a horizontal cylinder communicating with each other, a piston having a working fit in the vertical cylinder, bolts slidably mounted in the ends of the horizontal cylinder links connecting the piston to the bolts, a fluid line connected to the vertical cylinder and adapted to exert an upward movement on the piston to project the bolts from the ends of the horizontal cylinder, and spring means for lowering the piston to retract the bolts.

STANLEY G. LE GRESLEY.